Patented Aug. 12, 1952

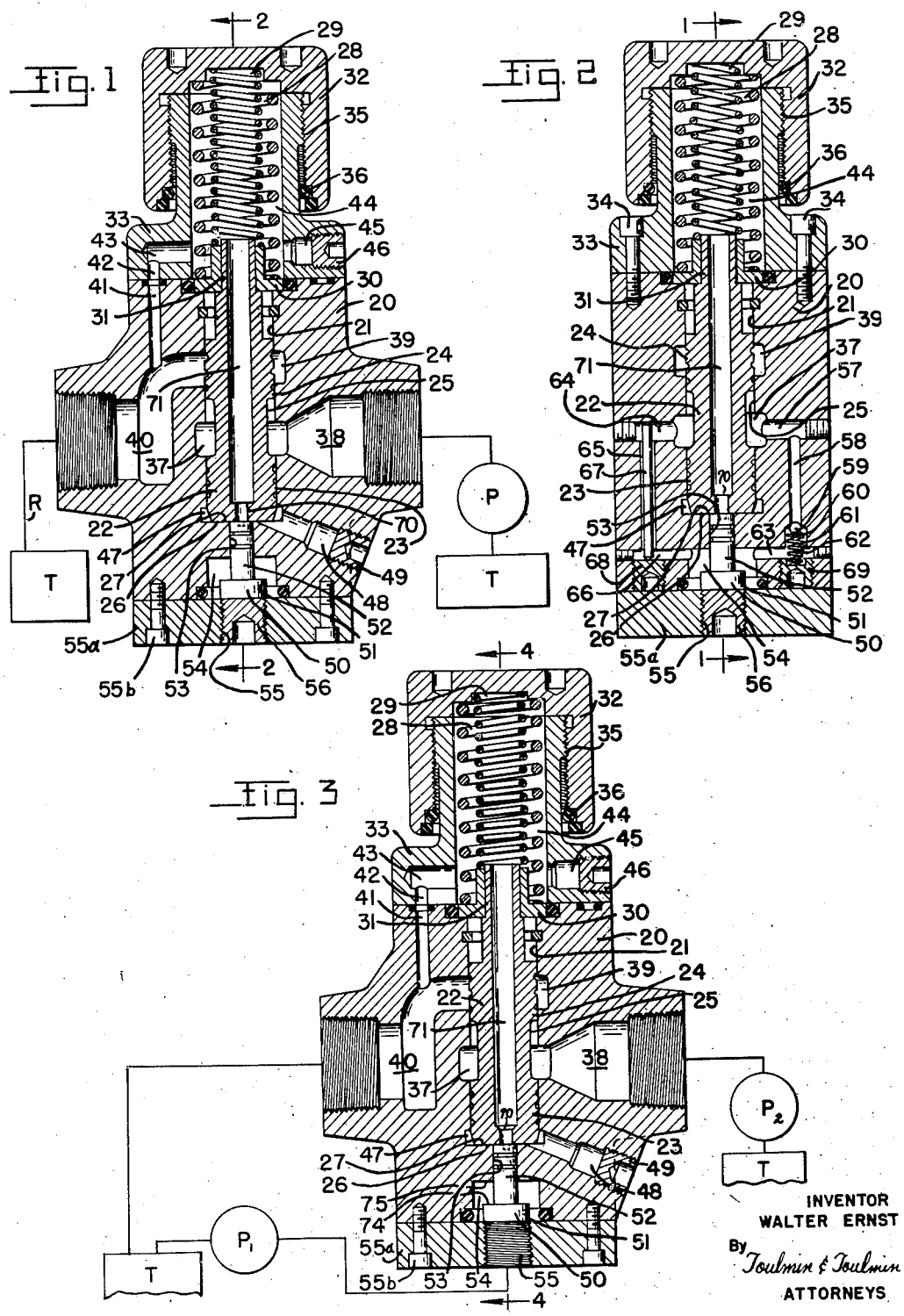

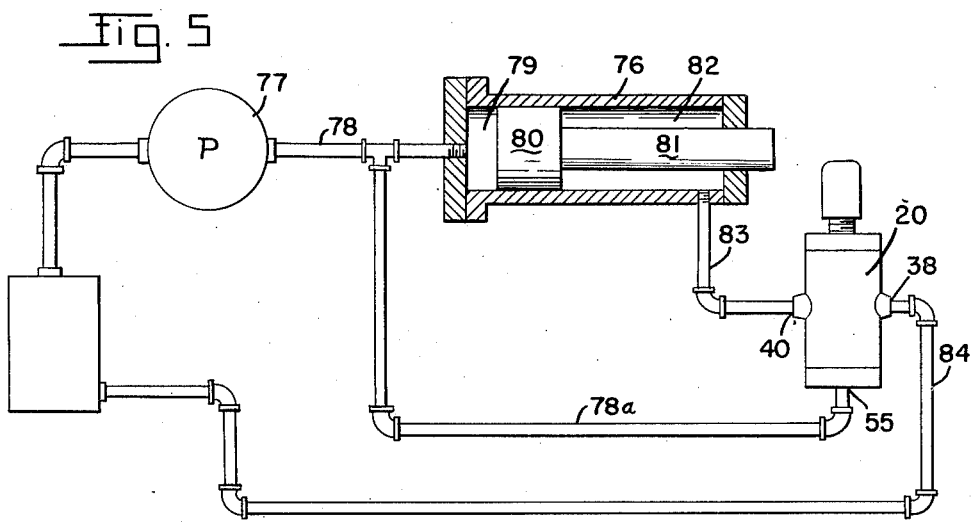
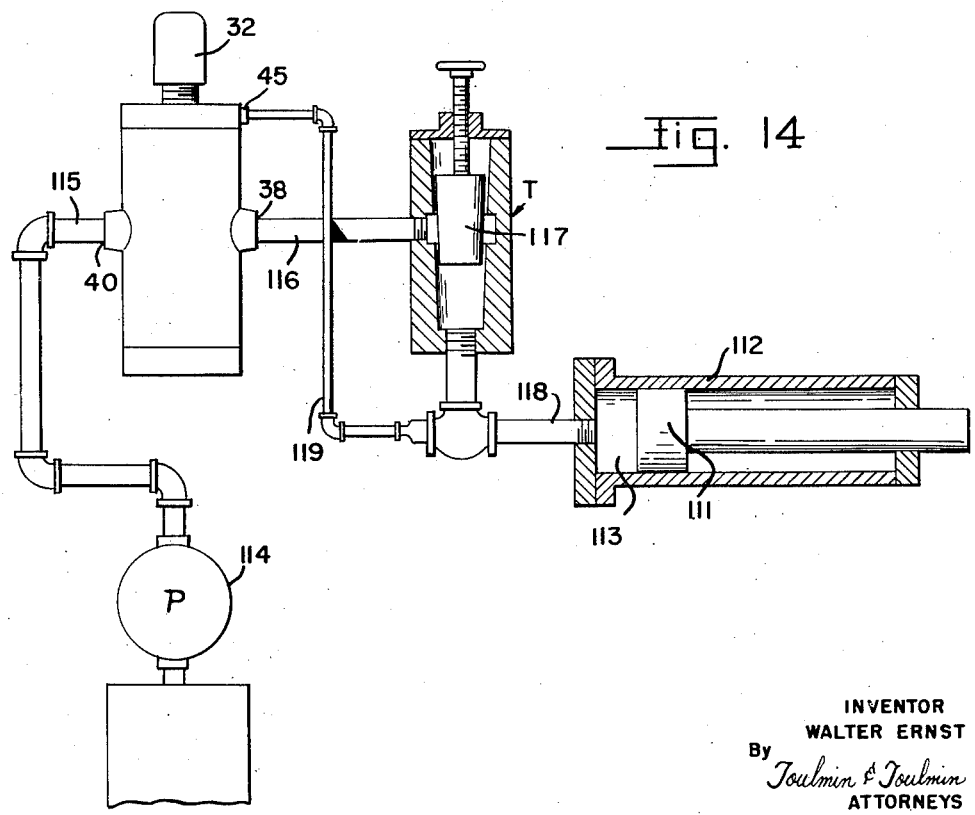

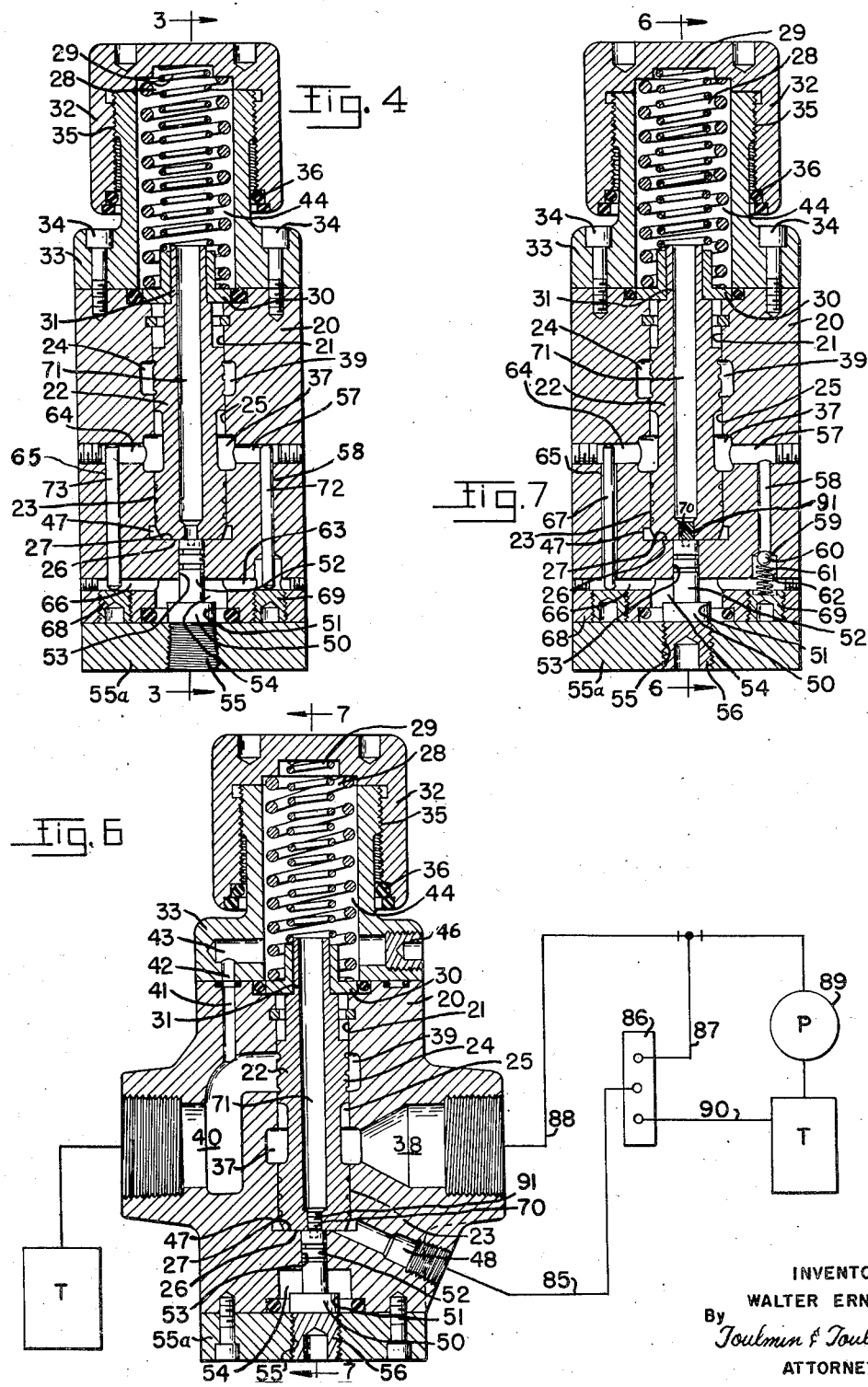

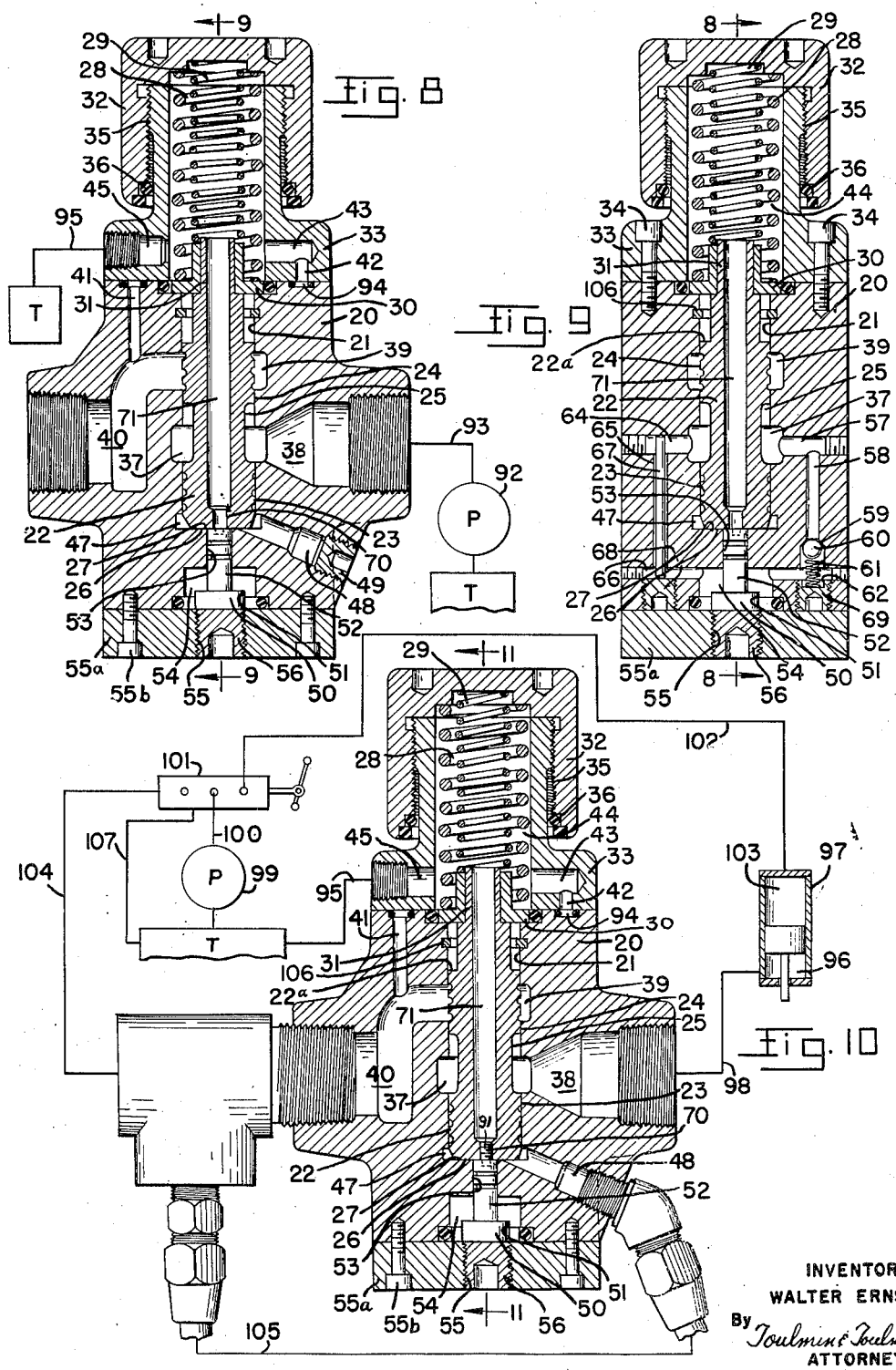

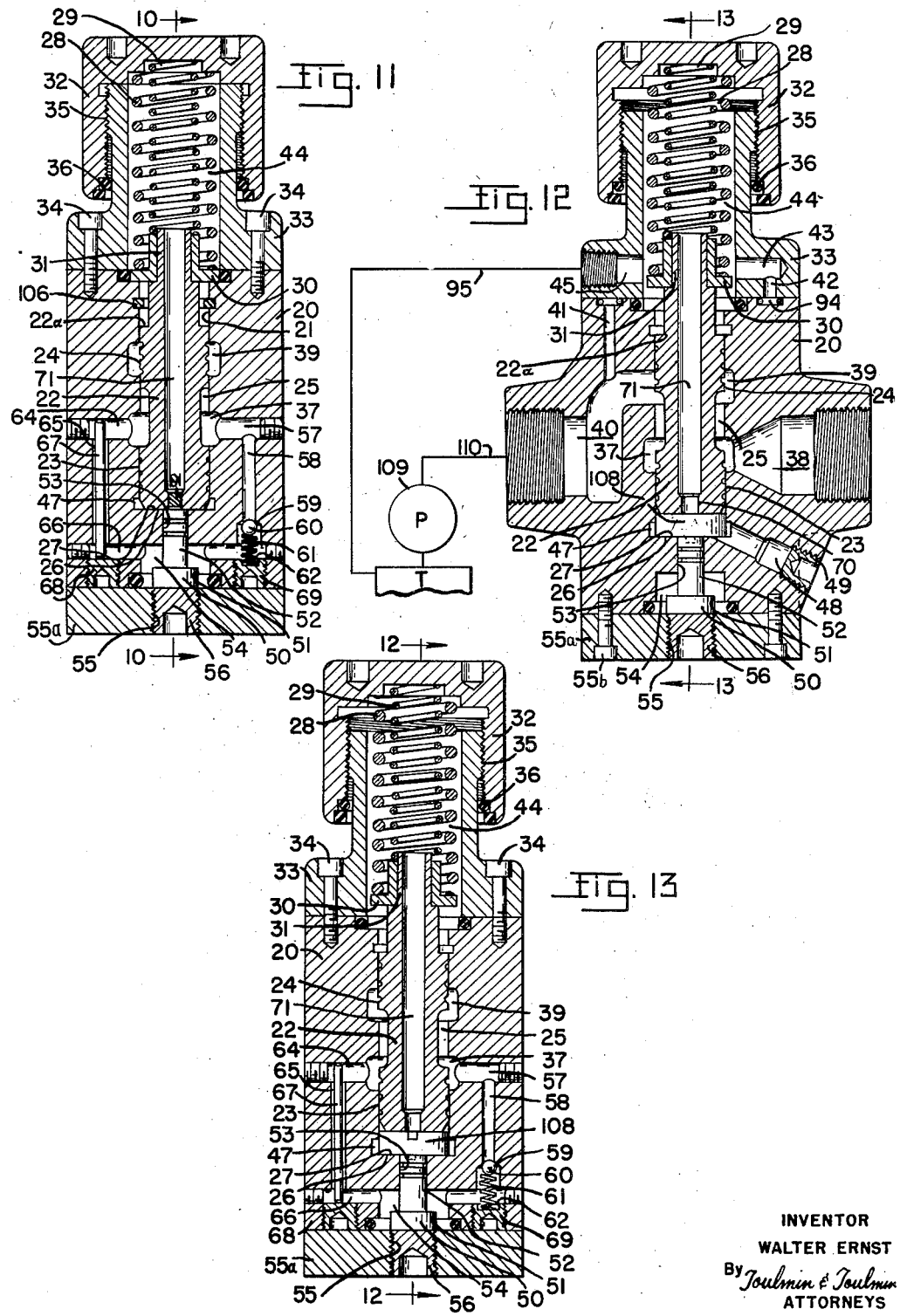

2,606,571

UNITED STATES PATENT OFFICE 2,606,571

MULTIPURPOSE CONTROL VALVE

Walter Ernst, Dayton, Ohio, assignor, by mesne assignments, to The Thompson Grinder Company, Springfield, Ohio, a corporation of Ohio Application October 22, 1948, Serial No. 55,913

15 Claims. (Cl. 137—270)

This invention pertains to improvements in fluid pressure control valves, and is particularly related to an improved type of multi-purpose valve which may be readily used with but minor adjustments therein, to provide a wide variety of pressure control in hydraulic circuits.

The general term of pressure control comprises valves which have the function of controlling the pressure existing in the hydraulic circuit, and in particular, of controlling the magnitude of this pressure.

Heretofore, a number of individual devices have been used, distinguished from each other by the function that they perform in the hydraulic circuit, and all having the common purpose of controlling the maximum pressure existing either in the circuit or in a part of the circuit. Accordingly, there are relief valves which control the maximum pressure existing in an entire circuit and prevent overload on pump and circuit. The relief valve will permit the flow of hydraulic fluid to escape to the tank whenever the maximum pressure is reached and will continue to maintain this maximum pressure.

Another pressure control is the unloading valve, which is used to control one of the pressures in a two-pressure circuit. When this pressure is reached the device producing it is unloaded by means of the unloading valve which is operated by the second source of pressure.

Another device used is the reducing valve. The purpose of this valve is to produce a fixed lower pressure in a part of the circuit and maintain that pressure regardless of pressure fluctuation in the rest of the circuit.

Another device is the dual pressure relief valve. This type of valve permits relief of pressure at a predetermined value, but by manipulation of an auxiliary directional control permits a much lower pressure to prevail in the system. Thus, during certain periods of operation in an hydraulic circuit, it is possible to lower the circuit pressure very considerably, which is an advantage in idle periods for operation of machine tools, etc., to cut down the amount of power consumption.

Another type of pressure control valve is the reverse flow resistance valve. The purpose of the the resistance valve is to prevent a vertical ram from dropping by gravity. To permit descent of this ram, it is necessary to supply a positive pressure before the resistance valve opens. When it is intended to return the ram, free flow or substantially free flow, is provided. Generally, this is done by a built-in check valve.

Another pressure control device is the so-called sequence valve. The purpose of this valve is to enforce a predetermined sequence in the operation of hydraulic devices. It is so arranged that the first device is directly connected to a pump and operates as soon as pressure begins to rise. When this pressure has reached a predetermined magnitude, the sequence valve will open and admit pressure to the second device, and so on. Thus, a predetermined sequence of operations in the hydraulic circuit is assured.

Almost all of these devices have been developed individually by different manufacturers as the development coincided with the necessity of application, and little or no consideration was given to their interrelated characteristics.

The fact is, there are certain basic principles of operation inherent in all of these devices, and by bringing them back to a common denominator, it is possible to perform all of the desired functions with one and the same basic valve by changing of passages by conveniently provided pipe plugs and through arrangement of the standardized parts. Thus, with one set of standardized parts it is possible to produce the entire line of pressure controls.

Therefore, one of the objects of this invention is to provide a simplified valve structure which may be readily altered to perform a series of different types of control functions in a hydraulic circuit by slight modifications and adjustments of the valve.

It is a further object of this invention to provide a multi-purpose valve arranged in such a way that a series of different control functions may be obtained by minor readjustments of a few parts of the valve.

Further features and advantages of this invention will appear from a detailed description of the drawings in which:

Figure 1 is a section through a multi-purpose valve incorporating the features of this invention, indicated on the line 1—1 of Figure 2, adapting the valve for use as a relief valve.

Figure 2 is a section on the line 2—2 of Figure 1.

Figure 3 is a section through the valve adapted as an unload or forward pressure relief valve indicated by the line 3—3 in Figure 4.

Figure 4 is a section through the valve on the line 4—4 of Figure 3.

Figure 5 is a circuit diagram utilizing the valve of Figures 3 and 4 as a resistance valve in a hydraulic circuit.

Figure 6 is a section through the valve adapted as a dual pressure relief valve, indicated by the line 6—6 in Figure 7.

Figure 7 is a section on the line 7—7 of Figure 6.

Figure 8 is a section through the valve adapted as sequence valve indicated by the line 8—8 Figure 9.

Figure 9 is a section on the line 9—9 of Figure 8.

Figure 10 is a section through the valve adapting it for use as a reverse flow resistance valve, indicated by the line 10—10 of Figure 11.

Figure 11 is a section on the line 11—11 of Figure 10.

Figure 12 is a section through the valve adapted to perform a reducing valve function indicated by the line 12—12 in Figure 13.

Figure 13 is a section on the line 13—13 of Figure 12.

Figure 14 is a hydraulic circuit diagram showing a specific application of the reducing valve of Figures 12 and 13 in combination with a throttle valve to produce constant flow regardless of resistance.

Referring to Figures 1 and 2 there is shown the basic form of the valve arranged as a simple relief valve comprising a body portion 20 having a central bore 21 in which is operatively slidable the valve plunger 22 having enlarged spool portions 23 and 24 which slidingly engage the bore 21 and between which is provided the annular groove 25.

The lower face 26 of the plunger 22 is held against the bottom face 27 of the bore 21 by biasing springs 28 and 29 which bear against a flanged bushing 30 on top of the reduced end portion 31 of the plunger 22 and which engage in the top of the threaded cap 32 mounted on the valve bonnet 33 which in turn is suitably bolted to the valve body 20 by suitable screws 34. The threaded connection at 35 between the cap and the bonnet is closed by a suitable packing 36 to prevent leakage of fluid at this point.

An annular groove 37 formed in the valve body 20 around the bore 21 communicates with a passageway 38 while a second annular groove 39 in the valve body 20 communicates with a passageway 40 in the valve body. A passageway 41 in communication with the passageway 40 communicates with a passageway 42 and 43 in the valve bonnet 33 which in turn communicates with the central bore 44 in the bonnet containing the spring 28 and 29. A second passageway 45 also communicates with the central bore 44 and may be closed off with a suitable pipe plug 46 in this particular arrangement for use as a relief valve.

A chamber 47 at the bottom of the plunger 22 communicates with a passageway 48 which may be closed off by a suitable pipe plug 49 when the valve is in use as a relief valve. A pilot plunger 50 has an enlarged head portion 51 and a reduced portion 52 which nicely slidably fits in a bore 53 formed in the valve body 20, and engages the bottom face 26 of the valve plunger 22. A fluid pressure chamber 54 surrounds the pilot plunger and may be connected to a source of fluid pressure through a threaded opening 55 in a plate 55a held to the valve body 20 by suitable screws 55b. In Figure 1, opening 55 is closed off by a pipe plug 56.

Referring particularly to Figure 2, communicating with the annular groove 37 is a passageway 57 which communicates with a passageway 58 having a valve seat 59 engageable by a check valve ball 60 actuated by a spring 61 which is carried in a passageway 62 in communication with a passageway 63 connected into the pressure chamber 54 for actuating the pilot plunger. A second passageway 64 is connected through a passageway 65 to passageway 66 also in communication with the pressure chamber 54 for the pilot plunger. A pin 67 of somewhat smaller diameter than the passageway 65 is placed therein and held in operative position by a suitable pipe plug 68 in the valve body 20. A suitable pipe plug 69 provides access to the chamber 62, the spring 61 and the check valve ball 60.

In this arrangement of the valve as a relief valve, a source of fluid pressure from a pump P is connected to the passageway 38 while the passageway 40 is connected to the return line R. Under these conditions pressure builds up in the chamber 38 in the annular groove 37 and also passes out through the passageway 58 through the check valve 60 into the pressure chamber 54 to cause the pilot plunger 50 to rise and lift the valve plunger 22 in opposition to the springs 28 and 29 when the desired output pressure of the pump P has been reached. The connection to the pressure chamber 54 from the annular groove 37 through the passageway 65 choked by the pin 67 prevents chattering of the pilot plunger in maintaining proper positioning of the valve plunger 22 in maintaining the desired operating pressure. It will be noted that no return flow through the check valve 60 can occur so that when pressure is built up in the system suddenly it will pass through the check valve and under the pilot plunger and lift the balanced valve plunger 22. This causes a sudden drop of pressure which would cause the valve plunger to seat rapidly except for the choke escape opening in the passageway 65 in conjunction with the pin 67 which prevents too rapid a seating of the plunger.

In this arrangement the space formed by the bore 44 above the valve plunger is vented directly through the passageways 43, 42, and 41 to the drain passageway 40 which is connected to atmospheric return line.

A threaded passageway 70 in the bottom of the valve plunger 22 is left open at this time and communicates with a central bore 71 formed in the valve plunger 22 and being opened at its upper end and in communication with the bore 44 in the valve bonnet 33. Thus fluid trapped in the chamber 47 in the bottom of the valve plunger may readily escape up through the central bore 71 and finally discharge into the drain passageway 40 of the valve. There is thus provided a valve arrangement which limits the pressure in the fluid pressure system when the pump P is operating and which will cause the pump to operate under this pressure continuously.

Another form of pressure control arrangement is shown in Figures 3 and 4 in which the basic valve arrangement of Figures 1 and 2 is revised to provide an unloading or forward pressure resistance valve function, that is to unload a pump in a hydraulic system at a given pressure by means of another pump operating at a higher pressure. In this arrangement a high pressure pump P1 is connected to the passageway 55 from which the pipe plug 56 has been removed, so that it communicates with the chamber 54 for the pilot plunger 50 while a lower pressure pump P2 is connected to the passageway 38. The pump P2 cannot act on the valve plunger nor on the area below the pilot plunger because both of the passageways 58 and 65 are plugged off by tightly fitting pins 72 and 73 placed in these passageways and held therein by the pipe plugs 68 and 69. Therefore, at the point where pressure in the system is built up to a predetermined valve, the high pressure pump P1 will lift the pilot plunger and allow the low pressure pump to bypass its fluid from the passageway 38 into the drain passageway 40. As the pressure builds up, the valve plunger will lift higher until the shoulder 74 on the pilot plunger has engaged the surface 75 of the valve body 20 so that the valve will be wide open and allow the low pressure pump to bypass freely. Thus low pressure pump P2 is permitted to bypass at substantially zero pressure, while the high pressure pump holds open the unloading valve. It is to be noted that this different functioning of the valve is accomplished with exactly the same parts as those used on the relief valve of Figures 1 and 2 by minor rearrangement of the openings and passageways.

Another function for which this multipurpose valve may be used is that of acting as a resistance valve in a hydraulic circuit such as shown in Figure 5 wherein a double acting cylinder 76 is supplied with fluid pressure from a pump 77 through a line 78 to a pressure chamber 79 behind its piston 80 for the forward movement of the piston 80 and rod 81. A line 78a connects pressure from the pump 77 to the threaded passageway 55 connected to the pressure chamber 54 of the valve 20. The piston rod pressure chamber 82 of the cylinder 76 is connected through a line 83 to the passageway 40 of the valve 20 while the passageway 38 of this valve is connected to the drain line 84. In this arrangement there will always be a positive pressure in the pressure chamber 82 of the cylinder regardless of the work load. For instance, as this arrangement is used to operate a drill press spindle and as the drilling is taking place if there is a sudden drop off of load, as in the case where the drill breaks through the work, the plunger 22 cannot lunge ahead because as soon as the pressure in the chamber 79 drops, the unloading valve connected to the chamber 82 will close, trapping the oil in the chamber 82. Here again we find standard elements combined to produce a new combination serving a somewhat different purpose than the original arrangement.

Still another application of this valve for a pressure control is shown in Figures 6 and 7 showing a dual pressure relief valve. This valve arrangement operates as a regular relief valve like that shown in Figures 1 and 2. It should be noted, however, that the diagonal passageway 48 is connected under the valve plunger 22 which in turn is connected through a line 85 to a valve 86 which valve in turn is connected through a line 87 to the pressure supply line 88 from a pump 89 which is also connected to the passageway 38 of the valve 20.

With the valve 86 so adjusted as to block off line 87 at the valve 86 and to connect the line 85 to the drain line 90 and with the threaded passageway 70 closed off by a suitable plug 91 the valve functions the same as the valve arrangement of Figures 1 and 2. If at any point in the cycle of operation it is desired to drop the pressure in the system, the valve 86 is adjusted to connect pressure from line 87 to line 85 and to block off the drain line 90 so that the entire area of this valve is made available, that is, not only will pressure acting on the pilot plunger 50 operate to raise the valve plunger 22 but also pressure behind the valve plunger in the pressure chamber 47 will act on the valve plunger 22. Thus, the pressure will drop in the ratio that the area of the relief valve plunger bears to the area of the operating plunger. This ratio for instance, may be 5 to 1, which means the operating pressure in the system will drop down to 20% of the relief valve setting. With this valve, it is possible to drop the operating pressure in the hydraulic system at any point in the cycle when this pressure is not needed and to thus conserve power.

Referring particularly to Figures 8 and 9 there is shown an arrangement of the multi-purpose valve adapting it to a sequence valve arrangement. The purpose of this sequence valve arrangement is to permit pressure to build up in one part of a hydraulic circuit, which is the primary circuit indicated by the pump 92 for the pressure supply line 93 which is connected to the passageway 38 of the valve 20 and which has certain devices to be actuated connected to the line 93.

After this pressure has reached a fixed magnitude in the line 93, pressure passing into the pressure chamber 54 actuates the pilot plunger 50 lifting the valve plunger 22 and admitting pressure from the passageway 38 into the passageway 40 which is connected to a secondary circuit. As long as the pressure is above that required to open the valve as described, the valve will remain open supplying pressure from the primary circuit to the secondary circuit. If the pressure in the primary circuit drops below this setting of the valve, it will again close.

In principle, this valve arrangement is a relief valve relieving into a hydraulic circuit rather than into an atmospheric drain line, that is a drain line having no fluid back pressure. In order to accommodate the valve to this arrangement, a separate drain for the central bore 44 in the bonnet 33 is provided so that the back pressure in the secondary circuit cannot go back into the aforementioned central bore above the plunger and subject the plunger to opposing pressure. This is neatly accomplished in applicant's arrangement by removing the screws 34 from the bonnet 33 and rotating the bonnet 180° to the position shown in Figure 10 so that the passageways 42 and 43 are blocked off at the blind hole 94 of the valve body 20 and in which the pipe plug 46 is removed to open the passageway 45 for connection to an independent atmospheric drain line 95. The screw holes for the screws 34 are arranged so as to accommodate this turning of the valve bonnet 33 which is again clamped in position by the screws 34. This is the only modification necessary to produce sequence valve operation. Otherwise the principle of the valve is the same as that shown in Figures 1 and 2 as described. The primary pressure acting against the pilot pressure passes through the check valve 60 and will open the sequence valve against a predetermined spring pressure as soon as the hydraulic pressure on the operating plunger has reached a value sufficient to overcome the spring pressure, thus causing the primary pressure to escape into the secondary pressure outlet 40. The valve will stay open as long as the pressure in the system has a magnitude required to overcome the pressure of the springs 28 and 29. The choke valve 67 and the check valve 60 are again provided to prevent chatter as described in connection with Figures 1 and 2.

In Figures 10 and 11 there is shown a form of pressure control which is used to control, for example, the down speed of a hydraulic press double acting ram descending by gravity. In this arrangement it is desired to prevent descent by gravity and rely on a positive pressure to operate the ram at a predetermined speed. This valve is installed at the outlet of the retraction area 96 of the double acting cylinder 97 connected through a line 98 to the passageway 38 of the valve 20. Thus it is necessary to develop a pressure to push this ram down as by connecting pressure from a pump 99 through a line 100 and a selector valve 101 and line 102 connected to the forward or downward pressure chamber 103 of the cylinder 97.

When it is desired to return the ram by the cylinder 97, the valve 101 is moved so as to connect the pressure line 100 through the valve 101 and the line 104 to the passageway 40 of the valve 20. A branch line 105 connected to the line 104 in turn is connected to the passageway 48 and the pressure chamber 47 is connected to the valve plunger 22 to act on the larger area of the valve plunger so that it will lift it a small fraction of the pressure required for the original valve setting. The valve plunger will be held with its shoulder 22a up against a fixed snap ring 106 positioned in a slot in the bore 21 of the valve body 20 so as to maintain intercommunication of the passageways 40 and 38 of the valve so that the pump pressure from the pump 99 is applied to the retraction chamber 96 of the cylinder 97 while the line 102 is connected through the selector valve 101 to the return drain line 107. In this arrangement the small opening 70 in the bottom of the valve plunger 22 is closed and a separate drain line provided for the bonnet 33 as in the case of Figure 8 is provided by appropriately positioning the bonnet 33 on the valve body 20. In this way pressure entering the passageway 40 cannot escape into the drain line so that it can be effective to return the ram.

As another arrangement to which this multi-purpose valve is well adapted, there is shown in Figures 12 and 13 a reducing valve arrangement. In this case the valve plunger has been located differently than in all other cases so far described. The valve plunger 22 is positioned in an intermediate position of inter-communication between the passageways 38 and 40 of the valve by placing a slug 108 under the valve plunger 22. Thus the valve plunger is located so as to make a normally closed valve into a normally opened valve. The purpose of this reducing valve is to produce a fixed pressure in a secondary outlet regardless of variations in the primary pressure supply. The valve operates by allowing free flow from the passageway 40 supplied with pressure from a pump 109 through a line 110, into the passageway 38 of the valve. The action of the valve plunger 22 is controlled from the pressure in the passageway 38. As soon as the secondary pressure in the passageway 38 reaches a fixed predetermined amount it will lift the valve plunger by means of the small pilot plunger 50 and cut off communication between the passageways 40 and 38. Regardless of any variations in the pressure in the passageway 40, the secondary pressure in the passageway 38 will remain constant determined by the setting of the valve springs 28 and 29 and the screwed down position of the valve cap 32. If there is a tendency for pressure to leak out of the secondary system, the valve plunger will open connected from the primary pressure in the passageway 40 and apply fluid to the passageway 38 and thus make up the leakage. On the other hand if there is leakage of the primary pressure to the secondary pressure, the valve plunger will continue to rise until the secondary pressure relieves itself into the space below the valve plunger from where it can escape through the central bore of the valve plunger to the drain line. For this use of the valve, the opening 70 is left unplugged.

A specific application of this reducing valve is illustrated in Figure 14 showing a reducing valve and a throttle combination to produce constant flow regardless of resistance imposed by the member being actuated. This is done by combining the reducing valve as shown in Figures 12 and 13 with an adjustable opening throttle valve T used to meter in a fixed amount of fluid regardless of the pressure in the system or resistance to the movement of a hydraulic piston 111 in a cylinder 112 having a pressure chamber 113. As illustrated in Figure 14 a supply of fluid pressure is provided by a pump 114 through a line 115 to the passageway 40 of the valve and passes through the valve and then through a line 116 through the throttle 117 of the throttle valve T and then out through a line 118 to the pressure chamber 113 of the cylinder 112. The flow of oil as it passes through the throttle valve T sets up resistance, and the resistance is transmitted back through the line 116 to the pilot plunger 50, which regulates the valve plunger 22 to provide a fixed pressure in the line 116 behind the throttle valve T.

An auxiliary pipe line 119 is connected between the passageway 45 in the bonnet of the valve into the line 118 connected to the pressure chamber 113 in the cylinder 112 and the outlet of the throttle valve T. The central bore 71 in the valve plunger 22 is opened and connects the top and bottom areas which are then subjected to the same pressure. This pressure also acts on the pilot plunger which is subjected to the pressure acting on the bottom, and on the pressure at the intake or in the line 116 of the throttle valve for the hydraulic pressure extending in that line which must balance the hydraulic pressure in the outlet from the throttle valve plus the spring pressure of the springs 28 and 29 of the reducing valve. Therefore, the pressure in the intake of the throttle valve is always higher by a fixed amount than the pressure in the outlet of the throttle valve. Therefore, there has been provided a fixed pressure drop through the throttle valve which results in a constant flow regardless of the working pressure resisting in the system. By this particular arrangement, the minor addition of a simple throttle valve to the existing pressure control valve, a constant flow regulating valve may be produced that has patentable novelty.

And thus has been provided in a basic valve structure an arrangement whereby with a minimum of simple and easily adjusted and rearranged parts, a great number of pressure control functions may be provided for this multi-purpose valve by a novel design of the valve structure, with, a minimum of effort and time required to adapt the basic valve arrangement to accompany the essential hydraulic control features required in hydraulic circuits.

While the apparatus herein disclosed and described constitutes a preferred form of the invention it is to be understood that the apparatus is capable of mechanical alteration without departing from the spirit of the invention and that such mechanical arrangements and commercial adaptations as fall within the scope of the appended claims are intended to be included herein.

I claim:

1. In a multi-purpose valve having a valve body, an axially reciprocatable valve plunger in said body, inlet and outlet ports associated with said valve plunger adapted to be interconnected or cut off from one another by the positioning of said plunger, a pressure chamber behind one end of said plunger including means to connect said chamber exteriorly of said valve body to a hydraulic circuit, a pilot plunger engaging said valve plunger, a second pressure chamber in said valve body associated with said pilot plunger including means for connecting said chamber exteriorly of said valve body to a hydraulic circuit, a central bore in said valve plunger having means for connecting or closing off said central bore from said first mentioned pressure chamber, and spring biasing means engaging the other end of said valve plunger to oppose a force exerted on said valve plunger by application of fluid pressure in either or both of said first and second pressure chambers.

2. In a multi-purpose valve having a valve body, an axially reciprocatable valve plunger in said body, inlet and outlet ports associated with said valve plunger adapted to be interconnected or cut off from one another by the positioning of said plunger, a pressure chamber behind one end of said plunger including means to connect said chamber exteriorly of said valve body to a hydraulic circuit, a pilot plunger engaging said valve plunger, a second pressure chamber in said valve body associated with said pilot plunger including means for connecting said chamber exteriorly of said valve body to a hydraulic circuit, a central bore in said valve plunger having means for connecting or closing off said central bore from said first mentioned pressure chamber, and spring biasing means engaging the other end of said valve plunger to oppose a force exerted on said valve plunger by application of fluid pressure in either or both of said first and second pressure chambers, said spring biasing means being carried in a central bore of a valve bonnet fixed to said valve body, adjusting means for said spring means to regulate its pressure against the valve plunger comprising a threaded cap carried on said valve bonnet and bolting means for holding said valve bonnet to said valve body in a plurality of different positions so as to in one position connect the central bore of the valve plunger and the central bore in the bonnet to one of the ports of said valve and in another position to provide an independent drain connection for said bores in the valve plunger and bonnet.

3. In a multi-purpose valve having a valve body, an axially reciprocatable valve plunger in said body, inlet and outlet ports associated with said valve plunger adapted to be interconnected or cut off from one another by the positioning of said plunger, a pressure chamber behind one end of said plunger including means to connect said chamber exteriorly of said valve body to a hydraulic circuit, a pilot plunger engaging said valve plunger, a second pressure chamber in said valve body associated with said pilot plunger including means for connecting said chamber exteriorly of said valve body to a hydraulic circuit, a central bore in said valve plunger having means for connecting or closing off said central bore from said first mentioned pressure chamber, and spring biasing means engaging the other end of said valve plunger to oppose a force exerted on said valve plunger by application of fluid pressure in either or both of said first and second pressure chambers, said spring biasing means being carried in a central bore of a valve bonnet fixed to said valve body, adjusting means for said spring means to regulate its pressure against the valve plunger comprising a threaded cap carried on said valve bonnet and bolting means for holding said valve bonnet to said valve body in a plurality of different positions so as to in one position connect the central bore of the valve plunger and the central bore in the bonnet to one of the ports of said valve and in another position to provide an independent drain connection for said bores in the valve plunger and bonnet, means associated with said valve plunger for limiting its axial movement to a normally opened position comprising a slug placed in said first mentioned pressure chamber.

4. In a multi-purpose valve having a valve body, an axially reciprocatable valve plunger in said body, inlet and outlet ports associated with said valve plunger adapted to be interconnected or cut off from one another by the positioning of said plunger, a pressure chamber behind one end of said plunger including means to connect said chamber exteriorly of said valve body to a hydraulic circuit, a pilot plunger engaging said valve plunger, a second pressure chamber in said valve body associated with said pilot plunger including means for connecting said chamber exteriorly of said valve body to a hydraulic circuit, a central bore in said valve plunger having means for connecting or closing off said central bore from said first mentioned pressure chamber, and spring biasing means engaging the other end of said valve plunger to oppose a force exerted on said valve plunger by application of fluid pressure in either or both of said first and second pressure chambers, said spring biasing means being carried in a central bore of a valve bonnet fixed to said valve body, adjusting means for said spring means to regulate its pressure against the valve plunger comprising a threaded cap carried on said valve bonnet and bolting means for holding said valve bonnet to said valve body in a plurality of different positions so as to in one position connect the central bore of the valve plunger and the central bore in the bonnet to one of the ports of said valve and in another position to provide an independent drain connection for said bores in the valve plunger and bonnet, and means in said valve body to limit axial movement of said valve when pressure is applied in either or both of said first and second mentioned pressure chambers to normally opened position in the direction opposed to said spring means.

5. In a valve; a valve body having a flow passage with inlet and outlet ports, a valve plunger in said passage for controlling said ports, resilient means urging said valve plunger toward position to disconnect said ports, a plurality of pressure chambers at one end of said valve plunger to urge said valve plunger toward position to connect said ports, means for selectively supplying pressure fluid to one or more of said chambers, and channel means extending from said outlet port through said valve body and said valve plunger to one of said chambers said channel means being adapted for being selectively closed or opened to connect the said one chamber with the outlet port when the said chamber is not connected to a source of pressure, or to disconnect the said chamber from the port when the chamber is to be used as a pressure chamber.

6. In a valve; a valve body having a flow passage therethrough including inlet and outlet ports; a closed spring chamber on one end of the body, a valve plunger in said passage, spring means in said chamber urging said valve plunger toward position to disconnect said ports, a plurality of pressure chambers at the other end of said body for receiving pressure fluid to urge said valve plunger toward position to connect said ports, a channel extending from said outlet port to said spring chamber and through said plunger to the end thereof adjacent said pressure chambers, means for selectively supplying pressure fluid to said pressure chambers, and means in said plunger for selectively connecting or disconnecting said channel and one of said pressure chambers.

7. In a valve; a valve body having an axial bore extending inwardly from one end thereof, a pair of ports opening into said bore, a valve plunger in said bore adapted to bottom on the closed end of said bore and to form a pressure chamber therein; said member when so bottomed disconnecting said ports and being movable away from its bottomed position through an intermediate position wherein said ports are connected and to a second end position wherein said ports are again disconnected, a spring urging said valve member toward its bottomed position, a pilot plunger extending into the closed end of said bore, means to supply pressure fluid to the closed end of said bore and to said pilot plunger, and removable abutment means in said bore for halting said valve plunger in its intermediate position when acted on by pressure fluid in the closed end of said bore or by said pilot plunger.

8. In a valve; a valve body having an axial bore extending inwardly from one end thereof, a pair of ports opening into said bore, a valve plunger in said bore adapted to bottom on the closed end of said bore and to form a pressure chamber therein; said member when so bottomed disconnecting said ports and being movable away from its bottomed position through an intermediate position wherein said ports are connected and to a second end position wherein said ports are again disconnected, a spring urging said valve member toward its bottomed position, a closed spring chamber on the said one end of the body housing said spring, a pilot plunger extending into the closed end of said bore, means to supply pressure fluid to the closed end of said bore and to said pilot plunger, and means comprising passages in the valve body and in the valve plunger adapted for being selectively interrupted for selectively connecting said spring chamber with or disconnecting it from one of said ports, the closed end of said bore, or exhaust for adapting said valve to a variety of fluid controlling purposes.

9. In a valve; a valve body having an axial bore extending inwardly from one end thereof, a pair of ports opening into said bore, a valve plunger in said bore adapted to bottom on the closed end of said bore and to form a pressure chamber therein; said member when so bottomed disconnecting said ports and being movable away from its bottomed position through an intermediate position wherein said ports are connected and to a second end position wherein said ports are again disconnected, a spring urging said valve member toward its bottomed position, a closed spring chamber on the said one end of the body housing said spring, a pilot plunger extending into the closed end of said bore, means to supply pressure fluid to the closed end of said bore and to said pilot plunger, means comprising passages in the valve body and in the valve plunger adapted for being selectively interrupted for selectively connecting said spring chamber with or disconnecting it from one of said ports, the closed end of said bore, or exhaust for adapting said valve to a variety of fluid controlling purposes, and a spacer member removably inserted between the bottom of said bore and said valve plunger for halting said plunger in its intermediate position when actuated by said spring.

10. In a valve having a valve body with a flow passage therethrough and a pair of ports opening into said passage; a valve plunger in said passage, movable into opposite end positions wherein said ports are disconnected and having an intermediate position wherein said ports are connected, spring means urging said plunger toward one of its end positions, fluid operable means for urging said plunger toward the other of its end positions, and abutment means removably mounted in the valve body effective for engaging and halting said plunger in its intermediate position when it is acted on by one of said urging means.

11. In a valve having a valve body with a flow passage therethrough and a pair of ports opening into said passage; a valve plunger in said passage movable into opposite end positions wherein said ports are disconnected and having an intermediate position wherein said ports are connected, spring means urging said plunger toward one of its end positions, fluid operable means for urging said plunger toward the other of its end positions, and abutment means removably mounted in said valve body effective for engaging and halting said plunger in its intermediate position when it is acted on by said spring means, said last mentioned means comprising abutment means selectively positionable in said bore in the path of said valve member.

12. In a valve having a body with a bore with one closed end and a pair of ports; a valve plunger in said bore forming a pressure chamber with the closed end of the bore, said plunger having opposite end positions wherein said ports are disconnected and an intermediate position wherein said ports are connected, a closed spring chamber on said body at the open end of said bore and a spring therein urging said plunger towards the closed end of said bore and one of its end positions, channels extending from one of said ports to said pressure chamber and one including a check valve and another a choke, and means for selectively closing off said channels.

13. In a valve having a body with a bore with one closed end and a pair of ports; a valve plunger in said bore forming a pressure chamber with the closed end of the bore, said plunger having opposite end positions wherein said ports are disconnected and an intermediate position wherein said ports are connected, a closed spring chamber on said body at the open end of said bore and a spring therein urging said plunger towards the closed end of said bore and one of its end positions, a pair of channels extending from one of said ports to said pressure chamber and one including a check valve and the other a choke, another channel extending from said pressure chamber adapted for connection to point externally of said valve, means for selectively closing off said channels, and abutment means selectively adjustable for halting said plunger in its intermediate position during movement from one of its end positions.

14. In a valve having a valve body with a flow passage therethrough and a pair of ports opening into said passage; a valve plunger in said passage movable into opposite end positions wherein said ports are disconnected and having an intermediate position wherein said ports are connected, spring means urging said plunger toward one of its end positions, fluid operable means for urging said plunger toward the other of its end positions, and abutment means removably mounted in said valve body effective for engaging and halting said plunger in its intermediate position when it is acted on by said fluid operable means.

15. An arrangement as set forth in claim 11 wherein the abutment means is a snap ring removably mounted in the bore, the said bore being formed with a groove for releasably receiving said snap ring.

WALTER ERNST.

REFERENCES CITED

The following references are of record in the file of this patent:

UNITED STATES PATENTS

| Number | Name | Date |
|---|---|---|
| 228,493 | Tyler | June 8, 1880 |
| 347,213 | Walker | Aug. 10, 1886 |
| 1,294,151 | Page | Feb. 11, 1919 |
| 2,140,735 | Clarke et al. | Dec. 20, 1938 |
| 2,200,824 | Herman | May 14, 1940 |